United States Patent [19]

Ray et al.

[11] 4,353,121
[45] Oct. 5, 1982

[54] HIGH RESOLUTION, MARINE SEISMIC STRATIGRAPHIC SYSTEM

[75] Inventors: Clifford H. Ray; Neil A. Moore, both of Houston, Tex.

[73] Assignee: Fairfield Industries, Inc., Houston, Tex.

[21] Appl. No.: 179,283

[22] PCT Filed: Jul. 24, 1980

[86] PCT No.: PCT/US80/00925
§ 371 Date: Jul. 24, 1980
§ 102(e) Date: Jul. 24, 1980

[87] PCT Pub. No.: WO82/00365
PCT Pub. Date: Feb. 4, 1982

[51] Int. Cl.³ .......................... G01V 1/36; G01V 1/38
[52] U.S. Cl. ...................................... 367/21; 367/16; 367/24; 367/48; 367/59; 364/421
[58] Field of Search .................... 367/16–19, 367/21, 48, 52, 57, 59, 24; 364/421

[56] References Cited

U.S. PATENT DOCUMENTS

| | | | |
|---|---|---|---|
| Re. 23,552 | 9/1952 | Babb et al. | 367/20 |
| 3,012,223 | 12/1961 | Begun et al. | 367/48 |
| 3,226,967 | 12/1965 | Lash | 367/19 |
| 3,299,399 | 1/1967 | Bowers | 367/18 |
| 3,350,683 | 10/1967 | Sengbush | 367/16 |
| 3,406,777 | 10/1968 | Bemrose | 367/48 |
| 3,436,722 | 4/1969 | Strange | 367/16 |
| 3,441,902 | 4/1969 | Savit | 367/18 |
| 4,101,866 | 7/1978 | Ruehle | 367/21 |
| 4,136,756 | 1/1979 | Manin | 181/111 |
| 4,208,732 | 6/1980 | Ruehle | 367/52 |
| 4,209,854 | 6/1980 | Ruehle | 367/52 |

FOREIGN PATENT DOCUMENTS 7704341 10/1977 Netherlands .......................... 367/21

Primary Examiner—Nelson Moskowitz
Attorney, Agent, or Firm—Frank S. Vaden, III; Emil J. Bednar

[57] ABSTRACT

High resolution, high penetration marine seismic stratigraphic system wherein a slanted cable comprising spaced-apart hydrophone arrays gather seismic reflections so that the corresponding primary and ghost reflections from a common interface gradually are spaced apart. The primary reflections are time aligned and stacked. The ghost reflections are phase reversed, time shifted and time aligned to coincide with the time aligned primary stack and then stacked to give a combined primary and ghost stack, which effectively includes almost twice the information as from the primary stack alone. No inverse notch filters are needed to correct for the ghost phenomenon. Focused noise out of the vertical plane is also virtually eliminated.

23 Claims, 15 Drawing Figures

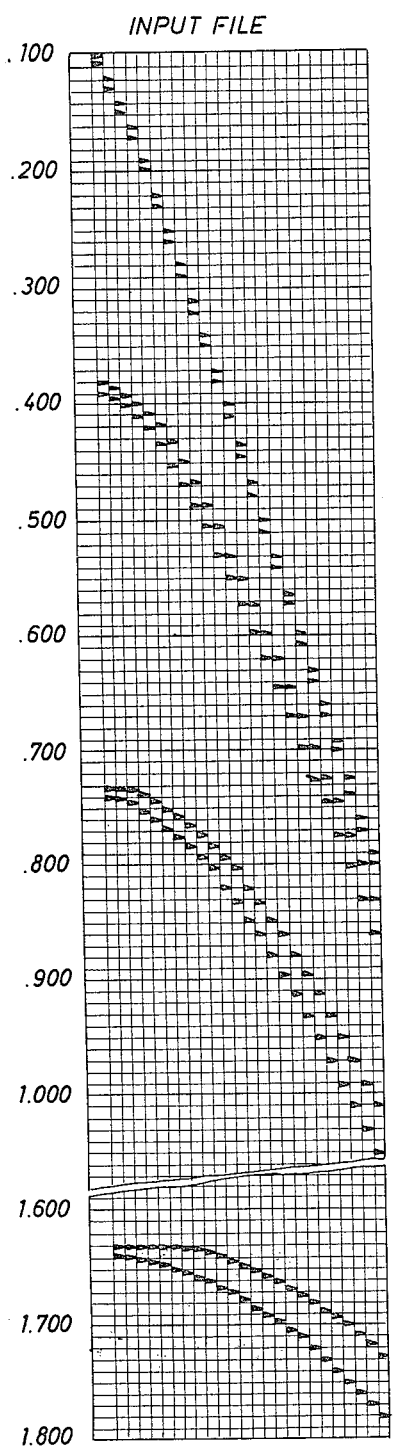
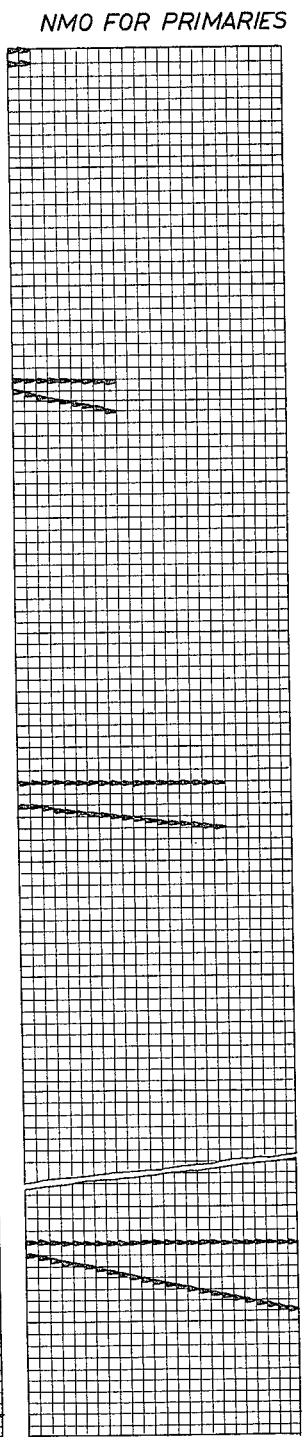
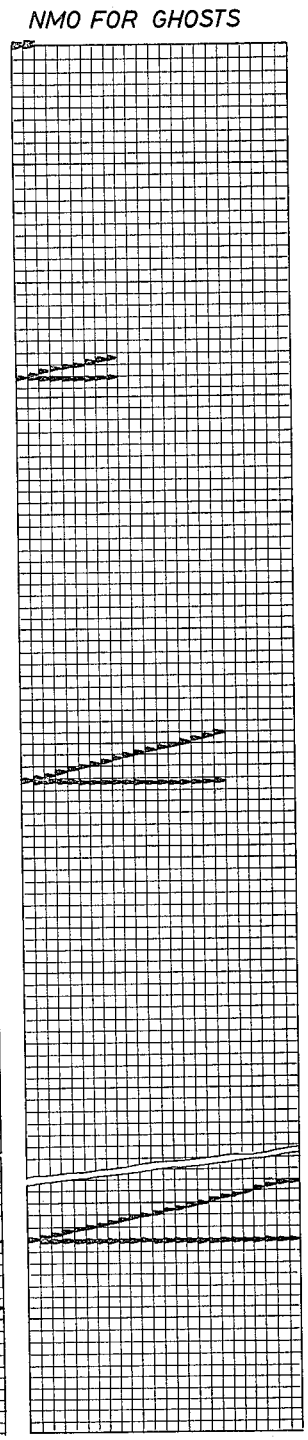
FIG. 8 INPUT FILE
FIG. 9 NMO FOR PRIMARIES
FIG. 10 NMO FOR GHOSTS FIG. 11
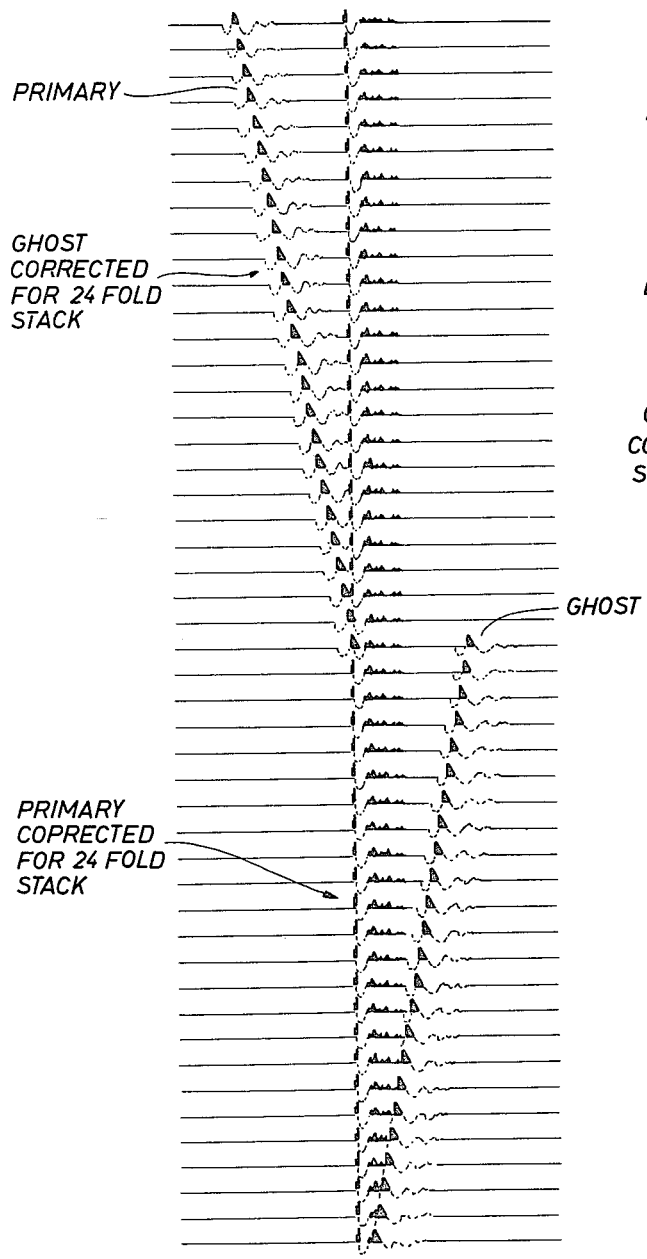
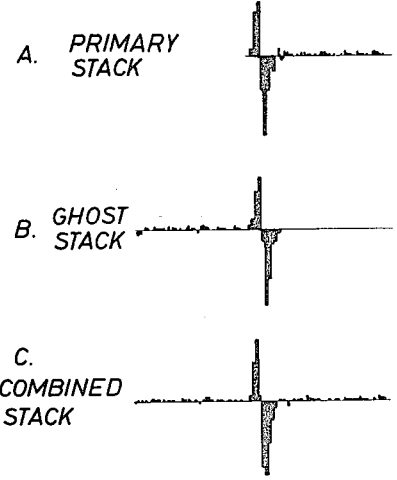
FIG. 12

HIGH RESOLUTION, MARINE SEISMIC STRATIGRAPHIC SYSTEM

TECHNICAL FIELD

This invention pertains to marine seismic stratigraphic systems and more particularly to an improved combined system of marine data gathering and data treatment for achieving high resolution, high penetration and high directivity.

BACKGROUND ART

In a typical marine seismic gathering system, it is customary that a vessel be equipped with both an acoustical energy source, usually on a submerged carrier towed by the vessel with certain control apparatus therefor being located on the vessel itself, and an acoustical detector array, usually in the form of a complex cable also towed by the vessel. Such a detector cable is typically towed at a shallow depth behind the vessel and is best characterized as a streamer or an extended cable including a plurality of seismic detectors or hydrophones. It is also usual for such detectors to be spaced along the streamer in multiple arrays, rather than singly. The towed streamer of the prior art is ideally neutrally buoyant and seeks a uniform depth beneath the surface of the water, usually in the vicinity of from one to three meters. The primary reason that the streamer is towed below the water surface is to avoid, insofar as possible, the effects of surface wave action or turbulence.

The returns detected by the hydrophone arrays are a result of the acoustic impulses from the source being reflected from the various subsurface seismic interfaces. One such interface is the interface between the water and the land, or in other words, the lake or ocean bottom. Other interfaces occur wherever there is a lithological variation or change. Knowledge of such interfaces or reflecting surfaces is extremely valuable in evaluating for the presence of hydrocarbon deposits and the like.

The gathered acoustic return data using such a streamer of hydrophone arrays is subjected to several natural phenomena which interfere with a clear interpretation of the data collected unless avoided or minimized and/or corrected for. One of these phenomena is surface noise. It is well-known that a hydrophone located at or near the water surface will pick up surface wave motion. Therefore, it has been found convenient to locate the hydrophone detectors below the water surface, typically on the order of one to three meters (although such below-surface location introduces ghost returns, which are discussed below).

Another recognized phenomena that must be considered before the collected data is clearly interpretable is the phenoemna known as correcting to a common depth point (CDP) file. Data may ideally be gathered to a common depth point; however, as will be explained, it is not normally practical to do that, particularly in a marine configuration setting. But, for an understanding of the concept, consider a horizontal reflecting interface with a point thereon as the "CDP". Along a parallel "datum" line above the interface, and to one side of a normal drawn to the CDP, are evenly spaced detectors. (Actually, there is normally a detector array, but for discussion herein "detector" is used to signify an associated arrayed group of individual detectors.) Along the datum line and to the other side of the normal drawn to the CDP, are equally evenly spaced sources. A first data trace would be the result of an impulse from the closest source being reflected off the interface and received at the closest detector. A second data trace would be the result of an impulse from the next closest source being reflected off the interface and received at the next closest detector. Similarly, data traces developed from successive sources to successive detectors, each resulting from a reflection off the interface at the CDP, would develop a "common depth point file".

However, there is normally only one source in a typical marine seismic system, which source is towed at a predetermined rate. Assuming that the detectors were stationary and evenly spaced, when the source was at a position corresponding to the first source in the above example, then the second, and so forth, an ideal CDP file could be developed. In the normal system, however, the detectors are not stationary, but are towed in conjunction or at the same rate as the source. Therefore, it may be seen that a two-trace, or "two-fold" common depth point file is developed when the source is impulsed at an initial position and then impulsed again when it and the detector cable have been towed together one-half of the detector spacing distance, the first impulse being detected by the first detector and the second impulse being detected by the second detector. The process can then be repeated for as many detectors as there are on the cable for a full-fold CDP file.

Of course, data is not actually collected in the field in the manner just described. In actual practice, a source impulse is detected at all of the detectors, but not from a common depth point. Then at a second location of the source, which normally would be at a distance from the place where the source was first impulsed, the source is again impulsed and detected at each of the detectors, again following reflection from different depth points. From the individual field recordings, data associated with a common depth point is selected and is built up in what is truly a common "CPD file". Hence, interpretation is not from the field recordings but from the CDP files.

Because the travel time for an impulse from the source to the reflecting interface to the detector is longer for the second detected trace than for the first detected trace in a CDP file, and for the third detected trace than for the second detected trace, and so forth, a correction is necessary for the subsequent data traces or events to position them in time with the first data trace or event. Such correction is referred to as the normal moveout (NMO) correction. Factors involved in making such correction, which is different for each detector event resulting from a successively spaced detector, are well-known in the art and are explained, for example, in *Geophysics*, a publication of the Society of Exploration Geophysicists, Vol. 27, No. 6, published in 1962 at page 927, in an article entitled "Common Reflection Point Horizontal Data Stacking Techniques", W. H. Mayne, which is incorporated herein by reference for all purposes.

Distortion caused by cable droop is usually just tolerated. The buoyancy of a cable can be modified to achieve an adjusted location that is more parallel to the surface when there is an appreciable deviation therefrom. It is also possible to correct droop-distorted data by determining the amount of droop by a measurement and then correcting the data collected to the surface "datum" line, such as for correcting for uneven land surface swells in a land seismic system. This correction is usually done even when the cable is approximately parallel to the water surface anyway.

Unwanted noise, other than mere static or random noise, is a frustrating phenomenon that is also usually just tolerated. Such noise can arise out of the vertical plane or profile of the cable and may be the result of a source not related to the seismic source employed in the system or it may be the result of a reflection other than an lithological interface barrier from below. For example, a noise progressing underwater at a sideways angle to the cable constitutes such noise.

Perhaps the most distributing and hardest to correct of all external effects however, has been that data effect introduced by ghost reflections. A signal from the source progresses downward through the water until it is reflected upward by the interface at the bottom of the water to be received by the hydrophone. In addition, however, there is a reflection that continues to the surface where it is reflected downward by the water-to-air interface to be received at the hydrophone at a slightly later time than the direct or primary reflection. This reflection is referred to as the ghost reflection. The combined effect of the primary reflection and the ghost reflection is a distorted wave compared to the wave appearance of the source impulse. For example, assuming a source impulse having a broad frequency spectrum, the relative amplitude in the frequency domain being approximately centered about a mid frequency and gently rolling off therefrom over about three octaves, the arrival of the primary and its ghost reflections at a detector will produce a multiple humped-shaped response in the frequency domain having a notch or notches between each hump. The interrelated effect of the ghost reflection with the primary reflection can be analyzed to determine that at some frequencies within the spectrum there is interference cancellation and at other frequencies there is interference augmentation of reinforcement, resulting in amplitude distortion over the entire spectrum range. For each interface, there is a primary reflection and a ghost reflection. The distortion in the shape of the frequency domain response depends on the distance that the ghost reflection is from the primary reflection. The further the two are apart, the larger are the number of notches.

Since the results of the interaction of a ghost reflection on its primary reflection is subject to analysis, it is common to design an inverse electronic filter to correct for the amplitude distortion which results. In a very real sense, when compared to an ideal undistorted response, the actual reflected response can be viewed as having been subjected to an unwanted analog filter caused by the interface reflections and the mediums through which the reflections travel. Therefore, the purpose of inverse electronic filters employed in the prior art systems is to restore the reflected event response to appear as the source pulse, which it may be remembered in the above example, was shaped to have a smooth single hump in the frequency domain, its center frequency amplitude gently rolling off on either side thereof for about three octaves.

It is apparent that such compensating filter amplifies frequencies close to the notch greatly in order to restore the lost resolution. In doing so, it is also readily apparent that such inverse filter introduces noise and thereby introduces a signal-to-noise loss. The presence of an inverse filter also has the effect of reducing penetration of the effective source transmission and reflection reception since noise amplification is inherent and, hence, unavoidable.

For combination primary and ghost responses developed at detectors progressively further from the source than the near detector, as mentioned above, the Fourier transform response caused by the ghosting phenomenon creates so-called "trace depth notches", at slightly different locations from the notch of the response at the first detector. It should be noted, therefore, that the ghosting phenomenon introduces a phase as well as an amplitude distortion. Hence, to correct for both amplitude and phase distortion of these trace depth notches in these responses, it has been a practice in the prior art, at the appropriate phase positions involved (in other words, at the slightly different notch locations for the responses associated with each detector), to insert inverse filtering during the data processing stage. Such processing introduces compensating amplification at the notch locations and compensating attenuation for the sharp sides of the response on either side of the notches.

Therefore, it is a feature of the present invention to provide an improved high resolution marine seismic stratigraphic system that avoids, in the data handling portion of the system, the use of an inverse filter.

It is another feature of the present invention to provide an improved marine seismic stratigraphic system which, in gathering data and in its complementary treatment increases penetration with the same strength source as used in prior art systems by operating in such a manner to avoid amplifying noise. Hence, it is possible to achieve operation at a higher signal-to-noise ratio than that which was inherent in prior art systems.

It is still another feature of the present invention to provide an improved focused or directed marine seismic stratigraphic system, which as an overall system of data collection and processing, attenuates noise directed at the arrays of detectors located along a cable or streamer other than from the vertical direction by 6 db or more.

DISCLOSURE OF INVENTION

The high resolution marine seismic stratigraphic system disclosed herein comprises a broad frequency spectrum source for producing an impulse into the water, the source being associated with a vessel also towing a detector cable. This cable or streamer includes a plurality, preferably twenty-four, of hyrdophones or hydrophone detector arrays (often referred to herein as "detectors"), the closest one located close to the vessel but at a depth of about three meters beneath the water surface. The cable is buoyantly controlled to slope at a relatively constant angle, preferably of a little less than two degrees, so that the detector furtherest from the vessel is at a depth of about 38 meters. The primary reflection from each seismic interface and its corresponding ghost reflection is received by each detector and recorded on an appropriate field recorder in conventional fashion. For each reflecting interface, because of the slope of the cable, the primary and ghost reflections become further and further apart from detectors further and further from the source.

After recording, the data events are computer processed. Normal data processing operation applied to the recorded data include such things as demultiplexing, gain recovery, and sorting into common depth point files. Static time shifts are applied to correct the primary arrivals to a datum, usually the surface of the water.

Then for each interface, the velocity for the primary reflections is determined, the NMO correction is applied, and the primary reflections are time aligned and stacked in the time domain, thereby producing an enhanced or emphasized primary stack while not enhancing the individual ghost signals since they are not time aligned.

Static corrections are also applied to correct the ghost arrivals to datum and the phase of such arrivals is reversed. The velocity for the ghost reflections is then determined (which may be a little different from that of the primary since the water path for the ghost reflection may be slightly different than for the corresponding primary path), the NMO correction is applied, and the ghost reflections are time aligned and stacked in the time domain, thereby producing an augmented ghost stack while not enhancing the primary stack since they are not time aligned. The two stacks are then added to produce an effective 48-fold stack, instead of only a 24-fold stack as with the prior art systems. After completion of the above process, there is no amplitude or phase distortion produced by the ghosting phenomenon and there is a complete avoidance of the use of any inverse notch filter. Hence, with respect to prior art systems, the resolution is increased, the penetration is increased and the directivity or focus is enhanced (directed noise other than in the vertical plane being relatively non-enhanced and even cancelled to some extent in the above procedure).

BRIEF DESCRIPTION OF DRAWINGS

So that the manner in which the above-recited features, advantges and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings:

FIG. 8 is a diagram of a common depth point file in the time domain of primary and ghost reflections from progressively deeper interfaces or horizons at each of twenty-four detectors located along a cable in accordance with a preferred embodiment of the present invention without static corrections.

FIG. 9 is a diagram of static and NMO corrected data in the time domain of the primary and ghost reflections shown in FIG. 8, the primary reflections being time aligned and the data being muted to eliminate the effects of NMO stretch.

FIG. 10 is a diagram of static and NMO corrected data in the time domain of the ghost reflections shown in FIG. 8, the reflections having been phase reversed, the ghost reflections being time aligned and the data being muted to eliminate the effects of NMO stretch.

FIG. 11 is a diagram showing the effects of data alignment in accordance with the present invention following data gathering in accordance with the procedures of the present invention, but prior to stacking.

FIG. 12 is a diagram of stacking enhancement with respect to the primary reflections, the ghost reflections and the combination of both.

BEST MODE FOR CARRYING OUT THE INVENTION

Since the early 1970's numerous efforts have been made by the exploration industry to improve the resolution and accuracy of marine seismic data. Improvements have centered around controlled energy sources, digital recording and data processing. Instantaneous floating point recording and matching processing in high speed computers have substantially improved the reliability of reflection data and opened the door to more elaborate procedures such as migration and impedance displays, wavelet processing, synthetic modeling and three-dimensional presentation. All of these processes were aimed at improving the range of usefulness of the final resulting data. This has enhanced "stratigraphic" detailing and reservoir engineering as checked by frequently using well-logging data as an input to the processing. However, earlier supposed breakthroughs that in some cases later turned out to be disappointments, such as "Bright Spot", have taught the industry against depending on various computer techniques based on inadequate data.

The invention herein employs improvement in the collection of data which enables its improved treatment without artificial compensating filtering and amplification, thereby producing a breakthrough in data quality and usefulness.

Figure 1:
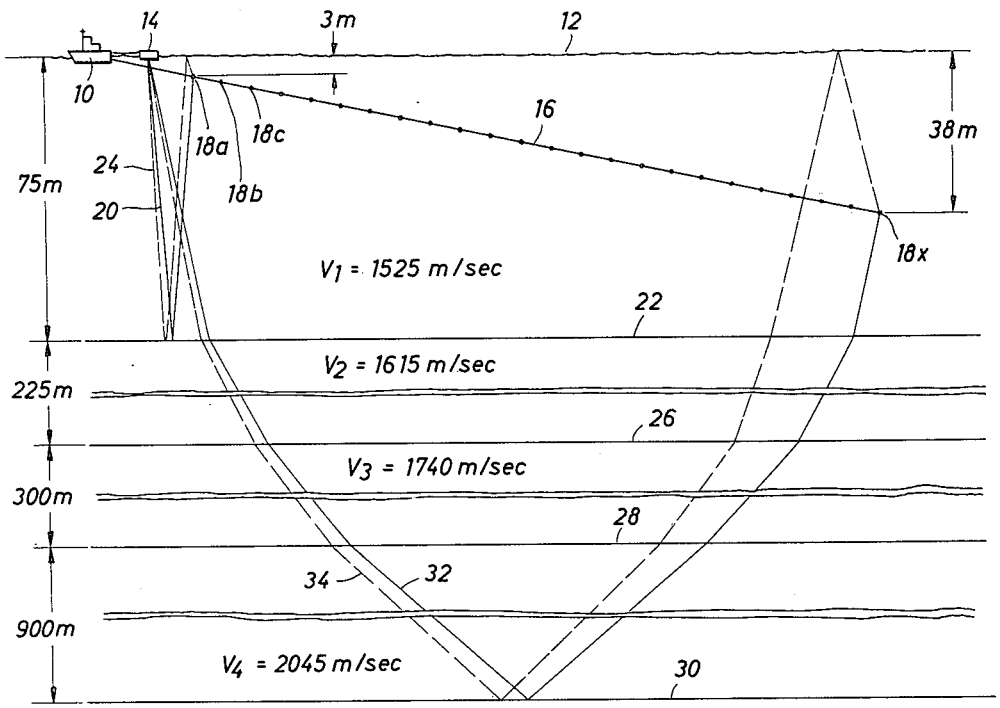
FIG. 1 is a schematic representation of a marine seismic stratigraphic system in accordance with the present invention.

Now referring to the drawings and first to FIG. 1, a marine seismic vessel 10 is shown moving on surface 12 of a body of water, normally the sea. An energy source 14 is towed by vessel 10 for imparting an impulse downwardly into the water. Although source 14 can be towed on the surface, alternatively the source can be towed below the surface.

A preferred energy source is the Fairflex$^{tm}$ minisleeve exploder system of Fairfield Industries, Inc. Such a source provides an energy pulse length of less than one-millisecond positive pressure and produces a nearly perfect acoustic wavelet having a finite period of less than three milliseconds and a broad frequency spectrum with a maximum at about 200–250 Hz, gently rolling above and below the maximum for about three octaves. The source is sleeve-contained and is held at a shallow towing depth of about two-thirds of a meter near the surface by a float system. The downward travelling energy is largely ghost free and substantially free of ringing.

Although such a source impulse is preferred, it should be noted that the invention hereinafter described is fully operable with less than such a perfect source. Preferably, it is desirable that the acoustic impulse is of finite length in the time domain and has a relatively smooth frequency spectrum over a somewhat broad range, viz., in excess of one and one-half octaves.

Also towed by the vessel is a cable or streamer 16 along which are located a plurality of hydrophone arrays or detectors, 18a, 18b, . . . , 18x. The cable slopes or is slanted from its front end to its tail end at a constant slope angle, as shown, preferably at about 1.75 degrees.

Preferably the cable is made of clear plastic polyvinyl or polyurethane tubing of about 3.8 cm (1½ inches) outer diameter. Twenty-four channels, each comprising 32 acceleration cancelling hydrophones over 12.5 meters in a binomial tapered array, are evenly located at regular intervals along an entire 1200 meter cable length. Hence, the center of each channel detector is spaced 50 meters from the center of its adjacent detector arrays. Such a streamer is naturally buoyant, even with the inclusion of or suspension of the hydrophone arrays therefrom. Therefore, it is necessary to also include weights distributed throughout to obtain the slanting required for the present invention. In addition, self-operated depth controllers are employed at typically four evenly spaced locations to correct for cable droop or rising. One such suitable controller is described in U.S. Pat. No. 3,931,608, "Cable Depth Control Apparatus", Jimmy R. Cole, Jan. 6, 1976, which is incorporated herein by reference for all purposes.

The front detector is positioned at a location conveniently beneath the surface of the water so as to be free of surface turbulence, which means a depth of approximately 3 meters (10 feet). With the slope at about 1.75 degrees, the twenty-fourth detector is positioned at a depth of about 38 meters (125 feet).

FIG. 1 is also useful for explaining the phenomenon of primary and ghost reflections, at least with respect to the ideal geological and lithological structure illustrated. In this example structure, the bottom of the sea is located at a depth of 75 meters (250 feet) beneath the surface. This water/land bottom interface creates a first subsurface reflecting horizon or interface. Located an additional 225 meters (750 feet) beneath the bottom is a second reflecting horizon or interface. Located an additional 300 meters (1000 feet) beneath the second interface is a third reflecting horizon or interface. Finally, for purposes of discussion, a fourth reflecting horizon or interface is located another 900 meters (3000 feet) beneath the third interface.

A path 20 of primary reflection to first detector 18a is from source 14, off reflecting interface 22 and then to detector 18a. The corresponding path 24 of ghost reflection is slightly in front of path 20 and is from source 14, off interface 22, off surface interface 12 and then to detector 18a. Similar primary and ghost reflections are received from interface 22 at each of the successive detectors 18b through 18x along cable 16.

For each of the seismic reflecting interfaces, namely, interfaces 26, 28 and 30, there is a primary reflection and a ghost reflection to each detector. For convenience, the primary and ghost reflections to detector 18x is illustrated. The primary path is path 32 from source 14, which refractively bends a little at interface 22, a little more at interface 26, a little more at interface 28, off interface 30 and then along refracted paths at each interfaces 28, 26 and 22 to detector 18x. Ghost reflection path 34 corresponding to primary reflection path 32 is ahead of path 32 and is longer than such path since it includes a segment following a reflection off interface 12.

It is also noted that the strata between the interfaces may have, for purpose of discussion, a different velocity characteristic with respect to an acoustical wave. The representative velocity for the water strata is 1525 meters/sec (5000 feet/sec). For discussion purposes, velocities of successively deeper strata are shown as 1615 meters/sec (5300 feet/sec), 1740 meters/sec (5700 feet/sec) and 2045 meters/sec (6700 feet/sec).

The cable slant is set to achieve an increase in the time domain between primary and ghost reflections from one detector or hydrophone array to the next of two milliseconds. The particular slope illustrated of approximately 1.75 degrees is selected to optimally attenuate the ghost (or primary) in the frequency band of most interest (viz., 30–250 Hz). Other slopes for the cable are operable, however, and even preferred for other selected frequency bands. For a discussion of the factors in establishing a slope for achieving a good response of an evenly spaced linear array at a selectable frequency of operation, reference is made to *Electromagnetic Waves and Radiating Systems*, copyright 1950 by Prentice-Hall, Inc., Edward C. Jordan, pages 422–428.

Figure 2:
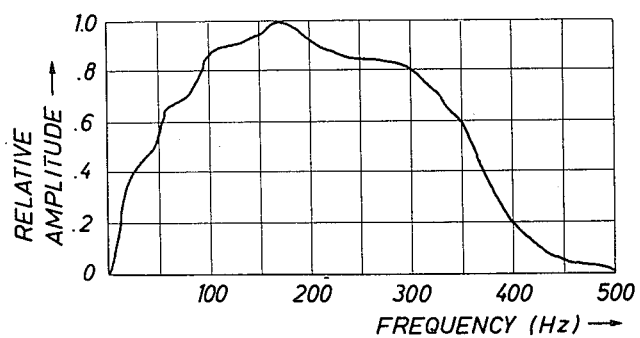
FIG. 2 is a diagram of the frequency spectrum of the source impulse used in a preferred embodiment of the present invention.
Figure 3:
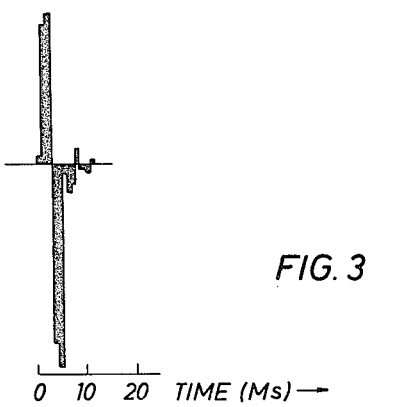
FIG. 3 is a digital time domain diagram of the source impulse shown in FIG. 2.

As discussed above, the source impulse, although very short in time duration, has a broad range of frequencies, preferably over about six octaves. Recorded through a 350 Hz anti-alias filter and digitally sampled in the time domain, the pulse appears as shown in FIG. 3. The frequency spectrum, on the other hand, appears in FIG. 2. It should be noted that in the frequency spectrum, the relatively largest amplitude is in the vicinity of about 200 Hz, the relative amplitude for adjacent frequencies gently rolling off below and above the centered largest amplitude frequency.

Figure 4:
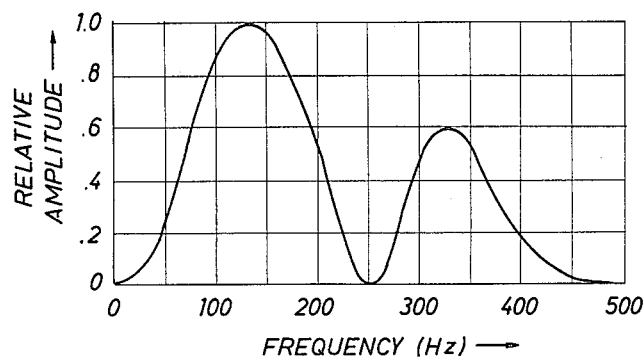
FIG. 4 is a diagram of the frequency spectrum of the combined primary and ghost reflection signals from a deep interface or horizon received at a first detector in the cable employed in the preferred embodiment of the present invention.
Figure 5:
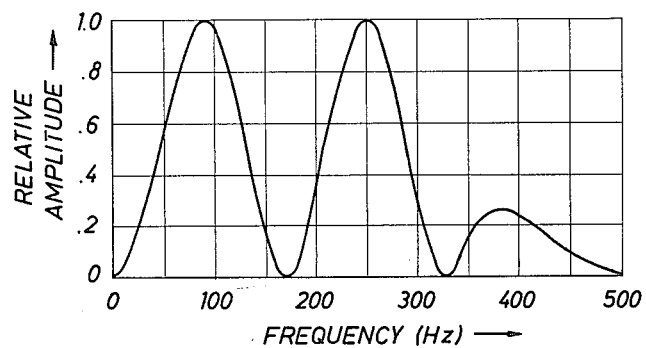
FIG. 5 is a diagram of the frequency spectrum of the combined primary and ghost reflection signals from the deep reflecting interface received at a second detector in the cable employed in the preferred embodiment of the present invention.
Figure 6:
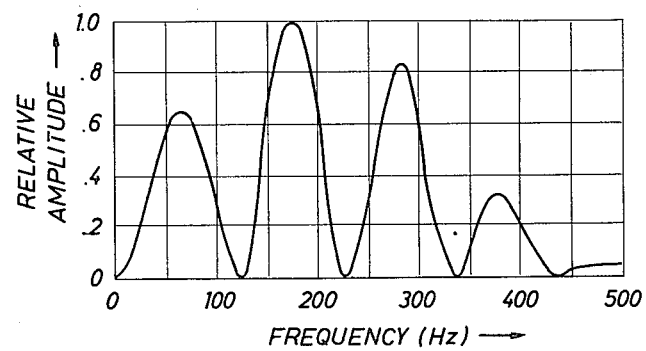
FIG. 6 is a diagram of the frequency spectrum of the combined primary and ghost reflection signals from the deep reflecting interface received at a third detector in the cable employed in the preferred embodiment of the present invention.

A Fourier analysis of two opposite polarity pulses, which the primary and ghost pulses are, results in a plurality of humps over the approximate frequency range of the source with intervening notches, depending on how close together the two separate polarity pulses appear to each other. Actually, over a larger frequency range, other humps appear, but for the approximate frequency spectrum of interest, from 0–500 Hz, when the two pulses are within, for example, 4 milliseconds, then only two humps and one notch appear. On the other hand, when the primary pulse of a first polarity and the ghost pulse of a second polarity are many milliseconds apart, as is the case with a deep reflecting interface as detected at a detector at the tail end of the cable, within the 0-500 Hz range there is a plurality of perhaps twenty-four humps with intervening notches. FIGS. 4, 5 and 6 are examples of the frequency spectrums as they exist at the first, second and third detectors or arrays, respectively.

Figure 7:
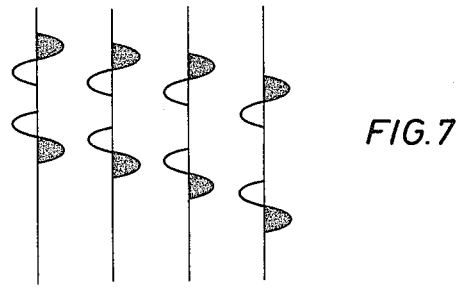
FIG. 7 is an expanded example of a time domain diagram illustrating for explanation purposes the shape and shading of the variable area traces shown in FIGS. 8, 9 and 10.

FIG. 7 is a blown up portion of a part of the diagram shown in FIG. 8 and illustrates the type of trace display shown in FIGS. 8, 9 and 10. The top trace in each of the four trace events shown is a primary reflection trace and the bottom trace in each of the four trace pairs is the corresponding ghost reflection trace. The type of trace pattern illustrated is a "variable area trace", wherein the area between the trace and a zero base line in one polarity is shaded solid and the area between the trace and the zero base line in the opposite polarity is not shaded. In the example, the primary trace of each pattern starts out in a positive polarity, so the first portion of such trace is shaded. The second portion of each primary trace is negative and, hence, unshaded.

Each of the corresponding ghost traces, on the other hand, starts out in a negative polarity and are unshaded as presented. The second portion of each ghost trace is positive, however, and hence, shaded.

As shown in FIGS. 8, 9 and 10, however, only the shaded portion of each trace is visible. Hence, the spacing between a primary and ghost reflection pair is exaggerated in FIGS. 8 and 9 since the first portion of the primary trace and the second portion of the ghost trace appears. As will be explained more fully below, the FIG. 10 traces are phase reversed and hence the diagram shows the respective primary and ghost reflection traces unduly close to one another. This may be shown by visualizing the unshaded portions of the traces shaded in FIG. 7 and the originally shaded portions, unshaded.

Now referring to FIG. 8, which represents a common depth point collection file, there are four patterns of pulse pair shown in this time diagram, one for each interface 22, 26, 28 and 30. Each pulse pair represents a primary pulse reflection and a corresponding ghost pulse reflection. The top pattern represents the primary and ghost reflections for interface 22 as those reflections are received at the respective twenty-four detectors. It should be noted that the times of arrival for the primary and ghost reflections as received at a particular detector are very nearly the same. This is true for all twenty-four pairs. However, the pattern is relatively steep, indicating that relatively little time is required for the reception of the primary and ghost reflections by the first detector compared with the time that is required for the reception of the primary and ghost reflections at the twenty-fourth detector.

The second pattern is similar to the first, with two exceptions. First, the overall steepness of the trace pattern is not so great. This means that although it takes more time for the reflecting pair to be received at detectors further from the source, the relative passage of time is not so great for the reflections from interface 26 as for interface 22. Second, although the primary and ghost reflections are close for the two reflections received at the first detector, the primary and ghost reflections tend to become further apart for detectors further from the source.

It will be seen that for interfaces 28 and 30, the patterns are progressively less steep, but the primary-to-ghost reflection spacing becomes progressively greater for the deeper interface reflections at the more distant detectors.

Now referring to FIG. 9, the primary file is time aligned so that all of the primary reflections for each of the detectors are time adjusted to be at the same time as that of the first detector or array. The ghost reflections are correspondingly adjusted in time; however, since there is a spacing progression in the original, this spacing progression is substantially maintained. It should be noted that the application of NMO correction causes the spacing not to be exactly maintained.

The time alignments shown in FIG. 9 are achieved in two steps. First, a static shift is applied to correct the primary events to datum by adding the vertical travel time from the water surface to the detector or array to each respective trace. Second, a normal moveout (NMO) correction is applied based on a velocity analysis conducted on the common depth point files after they are "datumized" (i.e., static shifted to datum) to the primary arrivals.

Also, applying the normal moveout correction to achieve time alignment tends to stretch the individual pulses. Since the most shallow interface trace pattern undergoes the greatest stretch, the pulses for those reflections that are time moved the most are also stretched the most. Therefore, there is a muting or dropping of data which has undergone a great deal of pulse stretching. This is standard in the practice for NMO corrections and does not have to be explained in greater detail. Different data manipulations determine where muting should occur on an individual judgement basis. However, it should be noted that for the corrected patterns of FIG. 9, only two reflection pairs have been retained for the top pattern, nine reflection pairs have been retained for the second pattern, eighteen pairs have been retained for the third pattern and all twenty-four pairs have been kept for the fourth pattern.

In similar fashion, as shown in FIG. 10, the ghost reflections are respectively time aligned for each of the four patterns. However, two additional adjustments are made therefor. First, the ghost reflections (and therefore the primary reflections as well) are phase reversed so that they assume the same phase as the primary reflections of FIG. 9. Next, the alignment of the ghost reflections are raised in time to correspond to the time of the primary reflections of FIG. 9 rather than to the time of arrival of the first ghost reflection pulse. Otherwise, this alignment is accomplished in a manner similar to that of aligning the primary arrivals. First, a static shift is made to correct the ghost arrivals to datum by subtracting the vertical travel time from the water surface to the detectors or arrays for each respective trace. Second, a normal moveout correction is applied based on velocity analysis conducted on the common depth point files datumized to the ghost arrivals.

Now referring to FIG. 11, there is shown the composite alignment of a primary-aligned pattern with a ghost-aligned pattern, the ghost-aligned pattern being time shifted to begin at the end of the primary pattern. As is seen, in the area where the primary reflections are aligned the ghost reflections corresponding to these primary reflections are misaligned so that each individual reflection pulse is offset in time from the others. Likewise, in the area where the ghost patterns are aligned, the primary pattern is such that these individual primary reflection impulses are misaligned or offset from each other.

FIG. 12A shows the effective stacking of the primary pattern just described; FIG. 12B shows the effective stacking of the ghost pattern just described; and FIG. 12C shows the effective combined stacking, all digitally sampled in a format for computer processing. It may be noted that the result is an effective 48-fold stack of the meaningful data, the stacking greatly enhancing or reinforcing the meaningful data without the use of artificial inverse filtering. In a sense, the composite stacking achieves effective gap filling of the frequency spectrum waveforms shown in FIGS. 4, 5 and 6, and the other similar waveforms for the other detectors or arrays compensating for both amplitude and phase distortions. The misaligned and hence, non-building waveforms do not enhance or augment each other and therefore are effectively discounted when compared to the 48-fold enhanced stack.

Figure 13:
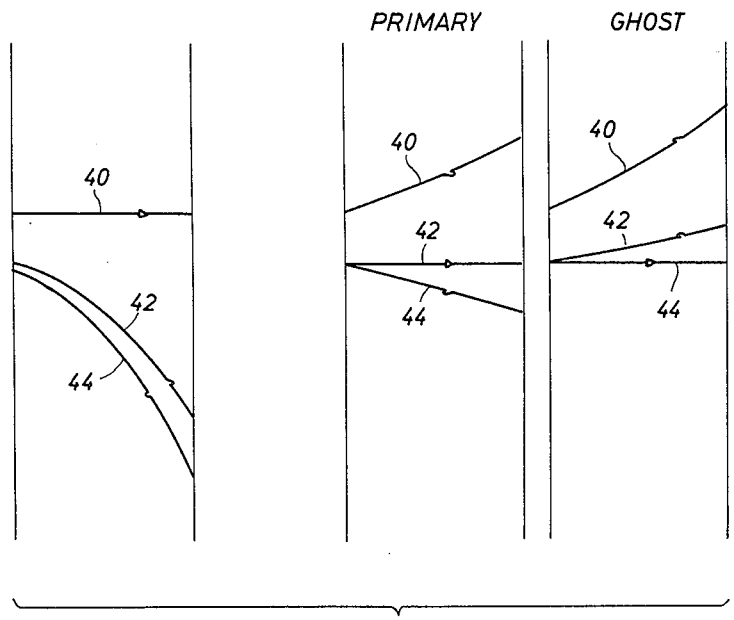
FIG. 13 is a diagram of the effect of the cancellation of noise not directed in the vertical plane, in accordance with the present invention.

Now referring to FIG. 13, a diagram of the cancellation of a specific directed pattern out of the vertical plane is shown. Such noise may occur, for example, from a totally foreign external source or may occur from a reflection of the source acoustic impulse reflecting from a surface at the side of the vertical plane passing through the cable.

If it is assumed that the polarity of noise 40 is positive and the polarity of primary pattern 42 is positive, then the polarity of ghost pattern 44 is negative. When the primary pattern is time aligned, the ghost pattern is non-aligned and the noise pattern is non-aligned. This means that stacking of the primary reflection impulses will cause an enhanced primary reflection combined stacking signal while relatively non-building both the ghost and noise patterns.

When ghost pattern 44 is phase reversed and time aligned, as discussed above, the primary reflection pattern is non-aligned and the noise pattern also is non-aligned. It should be noted that aligning the ghost pattern requires a little greater shifting than aligning the primary pattern. The effect on the noise is that the noise pattern is a little steeper than for the noise pattern corresponding to the aligned primary reflections. They are still not too far out of alignment with each other; however, they are phase reversed. Therefore, when the stack is made of the ghost reflection impulses with the primary reflection impulses, there is a tendency toward noise cancellation, especially for noise at the lower frequencies. So, not only is the noise not enhanced in the stacking, but there is some actual cancellation. The net result is an enhanced directivity for desirable signals arriving approximately vertically.

Figure 14:
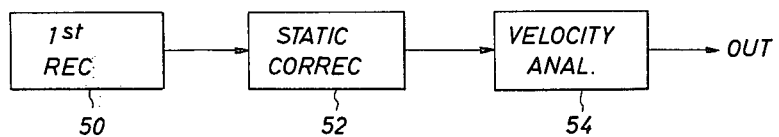
FIG. 14 is a block diagram of components used for velocity determination for data collected along a discrete lithological path for use in the present invention.
Figure 15:
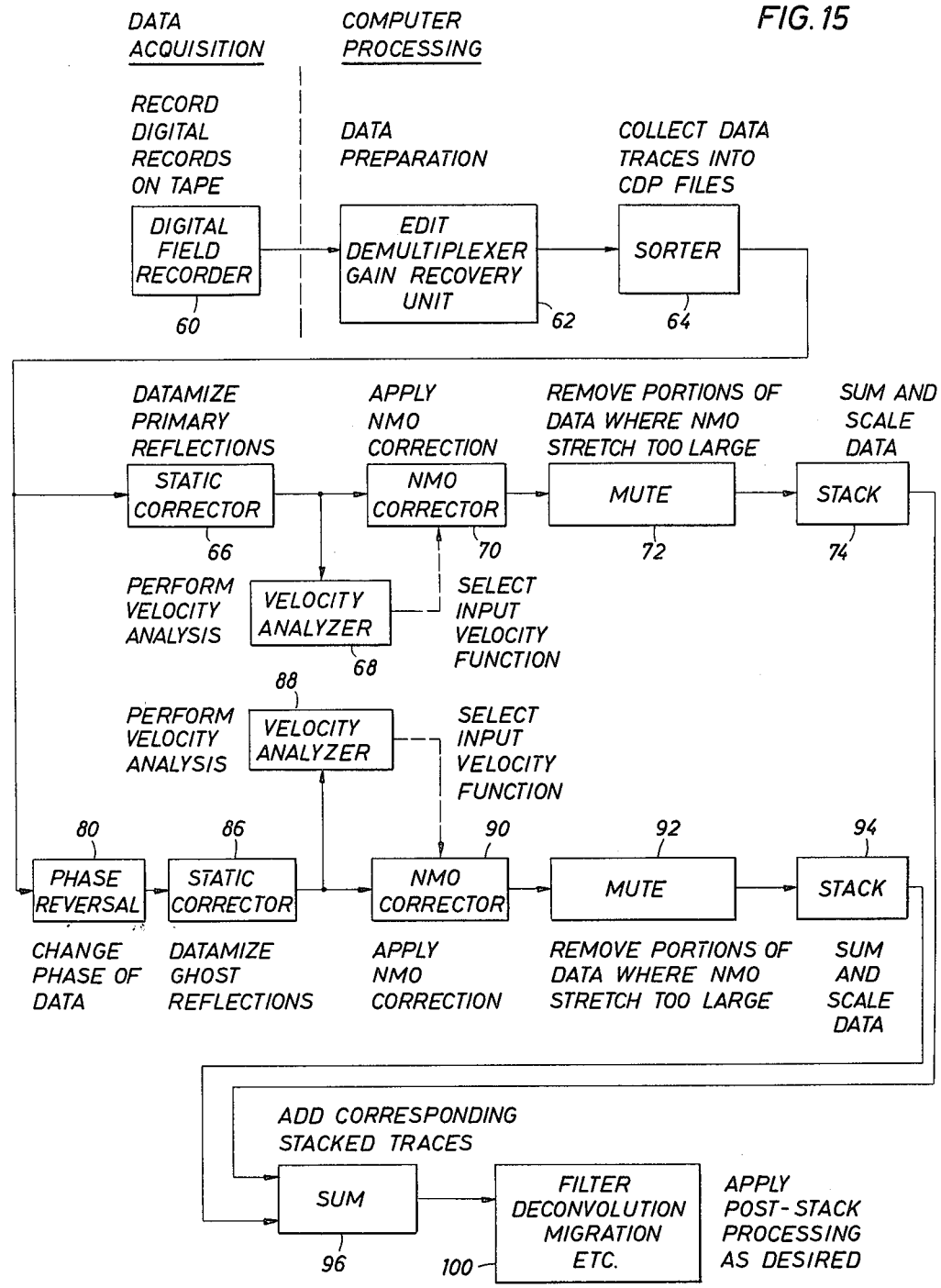
FIG. 15 is a block diagram of components used for data treatment in accordance with the present invention for producing a high resolution, high penetration, and high directivity marine seismic stratigraphic data.

FIGS. 14 and 15 illustrate via block diagrams one way of step-by-step achieving of the results just described. The detected reflections are digitally recorded on a magnetic tape recorder located on the vessel as the signals are received from the respective detectors or detector arrays located along the cable, as previously described. It can be assumed that uncorrected data is recorded on recorder 50. In order to determine what NMO correcting factors are to be applied to this recorded data, it is first necessary to determine the rms velocity of the average strata through which the reflection paths track. First, static corrections are applied to the raw data to correct the data to a datum or horizontal plane. This is done in static correction circuit 52 in conventional fashion. It should be noted that because the cable is beneath the surface of the water and is at a slope, this must be done. The primary static corrected curve under ideal conditions will tend to be hyperbolic. The absolute cable depth can be calculated from assumptions or actually measured for this purpose.

Basically, there are three ways to measure the depth of the cable at a given location of a detector or an array. First, the cable can be provided with independently operated depth detectors at a number of the hydrophone detector locations. Such depth detectors yield useful direct measurements.

The second method of determining depth is also from the data collected at the detector. This technique involves merely correlating a data window with respect to a phase reversal of the same data until the largest positive maximum occurs. The correlation lag time to this peak is the travel time of the ghost behind the primary, which is roughly the time of travel from the detector to the water surface and back again where the reflection energy propagates close to the vertical. This technique is most useful with respect to the deeper detectors toward the rear of the cable so long as the data is still strong.

Third, the depth can be measured by the development of a frequency response curve similar to that shown in FIGS. 4, 5 and 6. This may be done where the data is still clear enough to determine where a notch occurs and the number of humps preceding that notch. For example, in FIG. 4, the notch occurs at 250 Hz. The velocity of an acoustic wave in salt water is about 1525 m/sec (5000 ft/sec). Therefore, the two-way travel to the first detector producing the FIG. 4 response is $1525 \div 250 = 6$ m ($5000 \div 250 = 20$ ft.). Hence, the first detector is located appproximately 3 meters (10 feet) below the water surface.

In similar fashion, the location of the second detector can be determined from the response curve shown in FIG. 5. If the notch location is clearly locatable but the second is, then the first may be more precisely located by the simple expedient of dividing by two. It should be noted that this technique is particularly useful for measurements where there is overlap of primary and ghost reflections or for the detectors close to the front end of the cable.

Velocity analysis circuit 54 determines the velocity of the strata for use in NMO correction. Velocity determination is well-known in the art. One description is found in U.S. Pat. No. 3,550,073, Foster, et al., and another is found in *Geophysics*, a publication of the Society of Exploration Geophysicists, Vol. 34, No. 6, published December, 1969, on page 859, in an article entitled "Velocity Spectra-Digital Computer Derivation and Applications of Velocity Functions", M. Turhan Taner and Fulton Koehler, both of which are incorporated herein by reference for all purposes.

With the velocity information in hand, reference is now made to FIG. 15, which is both a block diagram of the operations involved in the preferred invention system as well as a sequence diagram of the steps involved.

The data acquisition step in the manner heretofore explained is concluded with the recording of the collected data by digital field recorder 60. This raw data is prepared in typical fashion as the analyzer deems appropriate. These steps are accomplished in the edit, demultiplexer and gain recovery unit 62. The prepared data is then collected into CDP files in sorter 64 for display in accordance with FIG. 8. At this point, the data is treated twice, once for primary reflection enhancement and once for ghost reflection enhancement.

Static correction for datumizing the primary reflections is performed by static corrector 66. Velocity analysis is then performed on the datumized results, as explained in connection with FIG. 14 by velocity analyzer 68, and the appropriate velocity function is selected for each CDP file for inputting to NMO corrector 70. NMO corrector 70 applies NMO correction to the data from static corrector 66 and the results are then muted in mute unit 72 to remove portions of the data where the analyzer determines that the NMO stretch was too large. The output from the mute unit are then summed for each CDP file and scaled in stack unit 74 so that the less muted files do not appear to be proportionally larger or significant than the more muted files. If this were not done, stacking of two traces for the top file of FIG. 9 would carry less significance than the stacking of the twenty-four traces for the bottom file of FIG. 9.

The data from sorter 64 is also supplied to a ghost channel where it is phase reversed by phase reversal unit 80, whose output is applied to static corrector 86 for datumizing the ghost reflections. Data is processed in units 88, 90, 92 and 94 for the ghost reflections in similar fashion to the processing performed respectively in units 68, 70, 72 and 74 for the primary reflections, as explained above.

The outputs from stack units 74 and 94 are added to produce a combined stack in sum unit 96. The analyzer can then, at his preference, further treat the results in unit 100, which may include one or more filters, deconvolution processes, migrations and the like.

INDUSTRIAL APPLICABILITY

In the frequency domain, increasing the depth of individual traces in effect generates a controlled multi-element filter. After dual NMO correction and stack, the notches related to trace depth disappear, producing a nearly perfect flattened response. This is ideal for full spectral recovery. Aside from substantial increases in signal-to-noise associated with the double stack, at least two other favorable effects are observed.

First, the deeper tow moves the cable or streamer detectors away from the noise created by the sea's surface. This permits operations to continue under more adverse weather conditions than with the prior art systems.

Second, phase reversal and double stacking suppresses source-generated reflection arrivals and other noise at any depth from out of the plane of the vertical profile. Even the deepest reflection data will have the benefits of this directive or lateral filter with attendant increase in clarity and resolution. The combined effects of the system just described is expected to provide data signal improvement in the order of 12–18 db and provide 5–8 millisecond resolution, with a resulting extremely accurate response to depths as deep as 10,000 feet in many areas offshore.

It may also be noted that the greatest enhancement of data is for the deeper reflection arrivals. Therefore, it is anticipated that the method described herein can be employed in association with prior art systems employing inverse filtering for the shallower reflections where the resolution is already satisfactory. The system herein is most advantageously employed for data collection and processing with regard reflections from the greater depths.

While a particular embodiment of the invention has been shown and described, it will be understood that the invention is not limited thereto, since many modifications may be made and will become apparent to those skilled in the art.

For example, the order of the steps or block in the system shown in FIG. 15 is not critical provided that the end results are the same, as illustrated and described hereinabove. Also, certain steps in the primary and ghost channels can be combined, although it should be noted that the static corrections and the velocity functions will be different for a corresponding primary and ghost reflection pair. However, this invention is not limited to the sequence of steps set forth above or to separate steps for each operation where operations are combinable in a single operating step.

Also, beneficial results may be achieved using a lower frequency (e.g., 10–125 Hz) conventional source than the source discussed above. For example, air guns or water guns can be used for an energy source and a longer cable having more detectors can be used as the streamer. Also, slightly lesser or larger slopes can be employed with respect to the cable or the cable can be reversed sloped or even sloped in a "V" configuration or an inverted "V" configuration, if desired. (It should be apparent that either of these latter two configurations could place two detectors at the same level below the water surface, but such configuration would still be quite operable in accordance with the present invention.) Higher frequency sources than that discussed above could also be employed, if desired.

Although the system of stacking the data hereinabove described is preferably a combined stack of the aligned primary data with an aligned ghost stack, superior results over the prior art are achieved from a primary stack alone or from a ghost stack alone. In some cases where the data processing cost factors are quite important or where the data is satisfactorily strong, these or other such considerations may determine that the preferred operation of the system is with less than full combined stacking.

We claim:

1. A marine seismic system comprising
a moving seismic source for producing an acoustic wavelet into the water,
a detector towed by a vessel moving synchronously with said source, comprising
a streamer including a plurality of hydrophone arrays spaced along its length,
buoyancy means provided to said streamer so as to provide a different depth below the water surface for each of the hydrophone arrays,
each of said arrays detecting primary reflections directly from subsurface interfaces and ghost reflections from the air-water interface, the time difference between primary reflections and ghost reflections being different for each hydrophone array in the streamer, and
primary reflection correction means for correcting the primary reflections to a datum, gathering data traces into common depth point files, applying NMO corrections to substantially align the primary reflections and in so doing misalign the ghost reflections, and stacking the common depth point traces in said common depth point files, thereby substantially deemphasizing the appearance of the ghost reflections, while emphasizing the primary reflections.

2. A marine seismic system in accordance with claim 1, and including ghost reflection correction means for providing phase reversal, correcting the ghost reflections to datum, gathering data traces into common depth point files, applying NMO corrections to substantially align the ghost reflections and in so doing misalign the primary reflections, and stacking the common depth point traces in said common depth point files, thereby substantially deemphasizing the appearance of the primary reflections and emphasizing the ghost reflections.

3. A marine seismic system in accordance withe claim 2, and including combining means for stacking the output of said primary reflection correction means with the output of said ghost reflection correction means.

4. A high resolution marine siesmic stratigraphic system, comprising
   a source towed by a vessel for producing into the water an acoustic wavelet having a broad frequency spectrum,
   a detector towed by said vessel, comprising
      a streamer including a plurality of hydrophone arrays spaced along its length,
      buoyancy means provided to said streamer so as to provide a slight slant in the water, the front end achieving a depth free of a substantial amount of water surface turbulence, said arrays being placed along its length so as to be at respectively increasing depths,
      each of said arrays detecting primary reflections directly from subsurface seismic interfaces and ghost reflections from the air-water interface, the time difference between primary reflections and ghost reflections being respectively increasingly time displaced as detected by arrays form the front end to the tail end of said streamer, and
   primary reflection correction means including means for correcting the primary reflections to a datum, gathering data traces into common depth point files, applying NMO corrections to substantially align the primary reflections and in so doing misalign the ghost reflections, and stacking the common depth point traces in said common depth point files, thereby substantially deemphasizing the appearance of the ghost reflections while emphasizing the primary reflections.

5. A high resolution system in accordance with claim 4, wherein said primary reflection correction means includes muting and scaling means so that the stacked traces for the respective interfaces are substantially free of NMO correction pulse stretch distortion and proportionally sized with respect to one another.

6. A high resolution system in accordance with claim 4, and including ghost reflection correction means for providing phase reversal, correcting the ghost reflections to a datum, gathering data traces into common depth point files, applying NMO corrections to substantially align the ghost reflections and in so doing misalign the primary reflections, and stacking the common depth point traces in said common depth point files, thereby substantially deemphasizing the appearance of the primary reflections amd emphasizing the ghost reflections.

7. A high resolution system in accordance with claim 6, wherein said ghost reflection correction means includes muting and scaling means so that the stacked traces for the respective interfaces are substantially free of NMO correction pulse stretch distortion and proportionally sized with respect to one another.

8. A high resolution system in accordance with claim 6, wherein said ghost reflection correction means includes data shift means for positioning the phase reversed and NMO corrected ghost reflections for alignment with the NMO corrected primary reflections.

9. A high resolution system in accordance with claim 8, wherein said ghost reflection correction means includes time delay means for said phase reversed and NMO corrected ghost reflections for serial alignment with said NMO corrected primary reflections.

10. A high resolution system in accordance with claim 4, wherein said acoustic wavelet of said source has a period less than about three milliseconds.

11. A high resolution system in accordance with claim 10, wherein said acoustic wavelet of said source has a maximum amplitude in the frequency domain at about 200 Hz and gently rolls off therefrom for about three octaves above and below said maximum amplitude.

12. A high resolution system in accordance with claim 4, wherein most of the frequency spectrum of said source wavelet is between about 0-500 Hz.

13. A high resolution system in accordance with claim 4, wherein said streamer includes 24 hydrophone arrays.

14. A high resolution system in accordance with claim 13, wherein said 24 hydrophone arrays are spaced at 25 meter intervals.

15. A high resolution system in accordance with claim 13, wherein said 24 hydrophone arrays are spaced at 50 meter intervals.

16. A high resolution system in accordance with claim 4, wherein said hydrophone arrays each employ acceleration cancelling hydrophones.

17. A high resolution system in accordance with claim 16, wherein each of said arrays includes 32 hydrophones arranged over 12.5 meters in a binomial tapered array.

18. A high resolution system in accordance with claim 4, wherein the array closest to the front end of said streamer is at a depth of about 3 meters.

19. A high resolution system in accordance with claim 4, wherein said slant is provided in the water at an angle of about 1.75 degrees.

20. A high resolution system in accordance with claim 4, wherein said slant is set to achieve an increase in the time difference between primary reflection and ghost reflection at one of said arrays of two milliseconds with respect to the immediately preceding array.

21. Method for developing high resolution marine seismic returns, which comprises
   introducing into the water an acoustic wavelet having a broad frequency spectrum,
   detecting the seismic returns caused by the wavelet at a plurality of locations, the first location being sufficiently beneath the surface of the water to be substantially free of surface interference, the successive locations being successively at slightly deeper locations, the ghost return from a seismic interface being received slightly after its primary return at the first location and the ghost returns from said seismic interface being received increasingly later with respect to their respective primary returns at successive one of said locations,
   aligning in time the primary returns, thereby causing the ghost returns to be out of time alignment,
   adding the time aligned primary returns to produce a greatly enhanced stacked composite primary return with respect to the non-enhanced ghost returns,
   phase reversing the ghost returns, thereby putting them in phase with the primary returns, aligning in time the phase reversed ghost returns, thereby causing the primary returns to be out of time alignment, adding the time aligned ghost returns to produce a greatly enhanced stacked composite ghost return with respect to the non-enhanced primary returns, and combining the enhanced primary return and the enhanced ghost return.

22. The method in accordance with claim 19, and including the step of shifting the aligned ghost returns to correspond with the aligned primary returns before said adding step.

23. The method in accordance with claim 22, and including the step of time delaying the shift aligned ghost returns to be immediately following the aligned primary returns prior to said combining step.

* * * * *

UNITED STATES PATENT AND TRADEMARK OFFICE
CERTIFICATE OF CORRECTION

PATENT NO. : 4,353,121

DATED : October 5, 1982

INVENTOR(S) : Ray, et al.

It is certified that error appears in the above-identified patent and that said Letters Patent are hereby corrected as shown below:

Column 12, line 35, "If the notch location is clearly" should read -- If the notch location is not clearly --.

Column 15, line 6, "A marine seismic system in accordance withe" should read -- A marine seismic system in accordance with --.

Signed and Sealed this

Fifteenth Day of February 1983

[SEAL]

Attest:

GERALD J. MOSSINGHOFF

Attesting Officer

Commissioner of Patents and Trademarks